(12) United States Patent
Haruyama

(10) Patent No.: US 8,619,202 B2
(45) Date of Patent: Dec. 31, 2013

(54) PROJECTOR

(75) Inventor: Akihide Haruyama, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 118 days.

(21) Appl. No.: 13/326,594

(22) Filed: Dec. 15, 2011

(65) Prior Publication Data

US 2012/0182486 A1  Jul. 19, 2012

(30) Foreign Application Priority Data

Jan. 14, 2011 (JP) ................................. 2011-005572

(51) Int. Cl.
*G02F 1/1335* (2006.01)

(52) U.S. Cl.
USPC ............ 349/5; 349/6; 349/7; 349/8; 349/107; 349/109; 349/78; 349/81; 349/83; 349/84

(58) Field of Classification Search
USPC ............ 349/107, 5, 109, 78, 81, 83, 84, 7, 86
See application file for complete search history.

(56) References Cited

U.S. PATENT DOCUMENTS

| | | | |
|---|---|---|---|
| 5,446,570 A | 8/1995 | Kaneko et al. | |
| 5,499,126 A | 3/1996 | Abileah et al. | |
| 5,818,615 A | 10/1998 | Abileah et al. | |
| 6,169,590 B1 | 1/2001 | Abileah et al. | |
| 6,842,207 B2 * | 1/2005 | Nishida et al. | 349/107 |
| 2003/0184685 A1 | 10/2003 | Song | |
| 2004/0239851 A1 * | 12/2004 | Tsukagoshi et al. | 349/117 |
| 2005/0122301 A1 | 6/2005 | Song | |
| 2005/0237463 A1 | 10/2005 | Kubo | |
| 2006/0007302 A1 * | 1/2006 | Numata et al. | 348/71 |
| 2007/0030424 A1 * | 2/2007 | Shimizu et al. | 349/113 |
| 2007/0058115 A1 * | 3/2007 | Utsumi et al. | 349/109 |
| 2008/0106655 A1 * | 5/2008 | Asao | 349/33 |
| 2009/0213307 A1 * | 8/2009 | Chiu et al. | 349/104 |
| 2009/0257014 A1 * | 10/2009 | Haruyama | 349/139 |
| 2010/0066952 A1 * | 3/2010 | Tsuchiya et al. | 349/106 |
| 2010/0110318 A1 * | 5/2010 | Ogawa et al. | 349/33 |
| 2011/0228177 A1 * | 9/2011 | Fukuda et al. | 349/5 |

FOREIGN PATENT DOCUMENTS

| | | |
|---|---|---|
| JP | 6-313878 A | 11/1994 |
| JP | 7-199173 A | 8/1995 |
| JP | 8-327984 A | 12/1996 |
| JP | 9-160030 A | 6/1997 |
| JP | 2005-521901 A | 7/2005 |
| JP | 2005-309267 A | 11/2005 |
| JP | 2007-156013 A | 6/2007 |
| JP | 2008-9195 A | 1/2008 |

(Continued)

*Primary Examiner* — Edward Glick
*Assistant Examiner* — Sang V Nguyen
(74) *Attorney, Agent, or Firm* — ALG Intellectual Property, LLC

(57) ABSTRACT

A projector includes: a lighting device that emits light of a plurality of different colors; a plurality of liquid crystal light valves that modulate the light of a plurality of colors; a color synthesizing optical system that synthesizes the color light modulated by the plurality of liquid crystal light valves; and a projection optical system that projects the light synthesized by the color synthesizing optical system to a projection target face. A cell thickness of one liquid crystal light valve modulating light of one color of the plurality of liquid crystal light valves is smaller than a cell thickness of the other liquid crystal light valves modulating the light of other colors, and an alignment state of liquid crystal at the time of applying the maximum gradation voltage is substantially the same in one liquid crystal light value and the other liquid crystal light valve.

9 Claims, 8 Drawing Sheets

(56) References Cited

FOREIGN PATENT DOCUMENTS

| | | |
|---|---|---|
| JP | 2008-46337 A | 2/2008 |
| JP | 2008-76567 A | 4/2008 |
| WO | WO-03-083563 A | 10/2003 |

\* cited by examiner

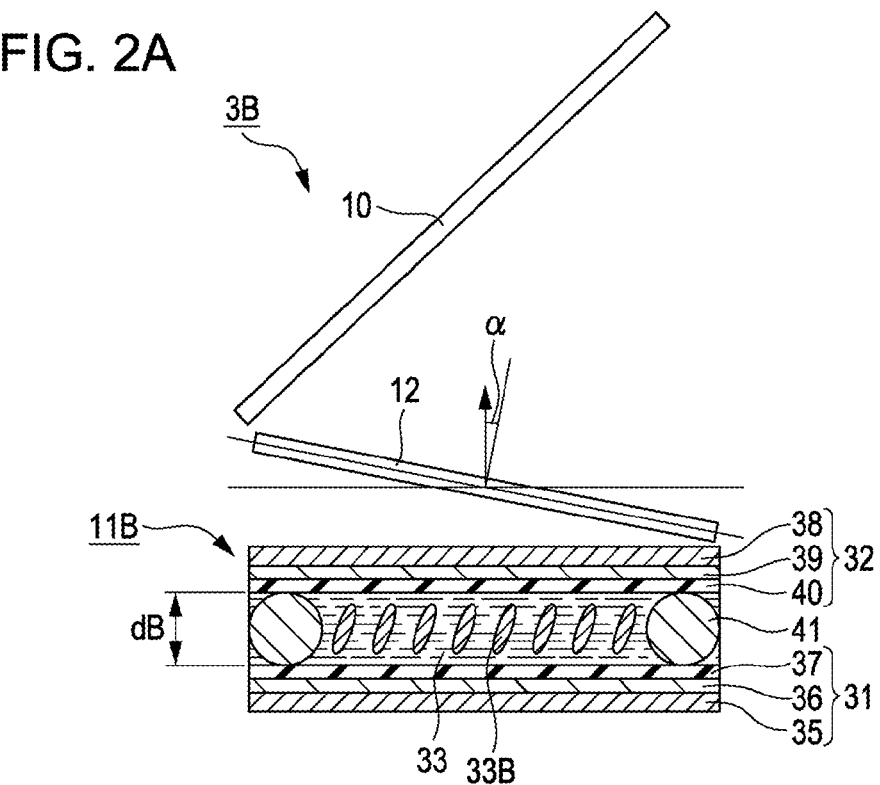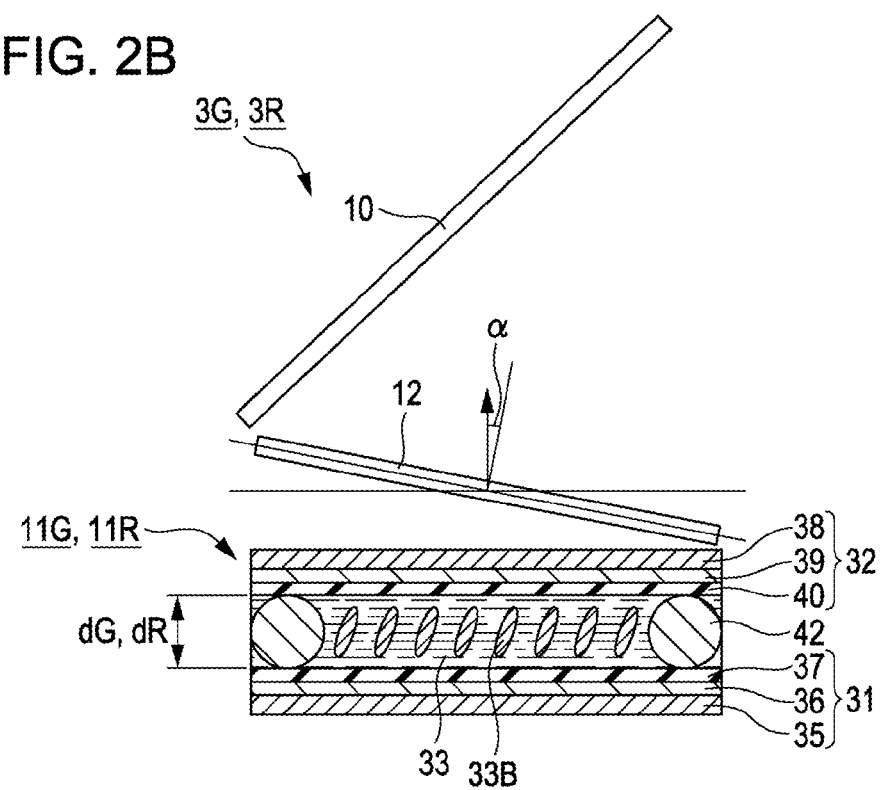

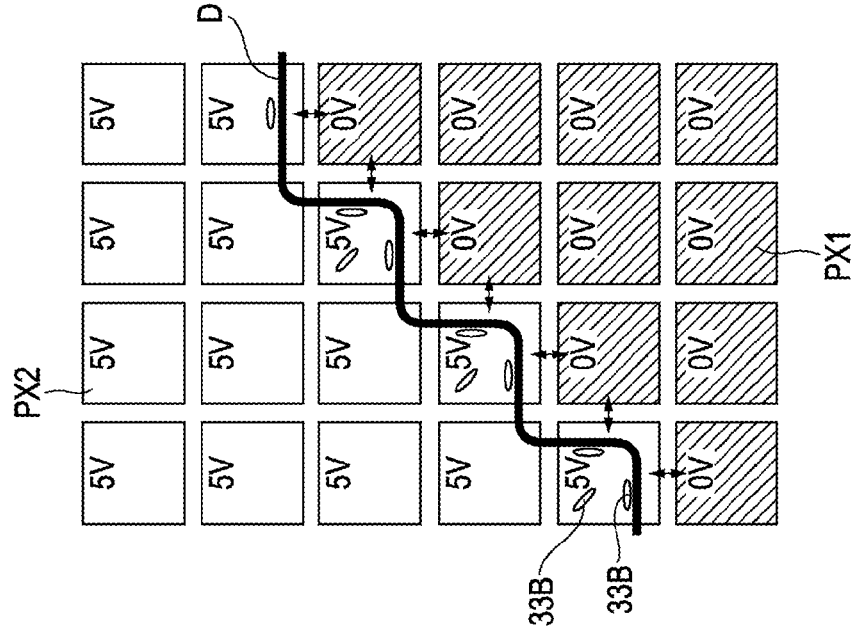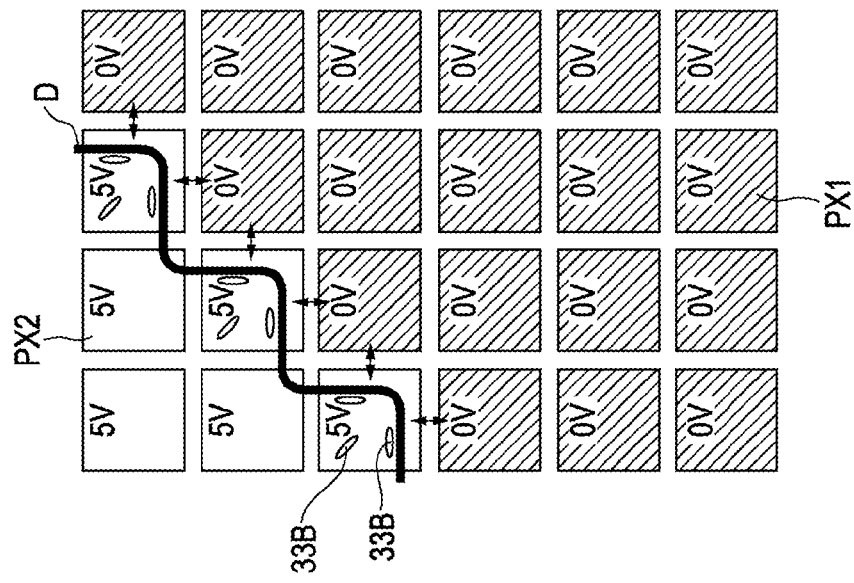

PROJECTOR

BACKGROUND

1. Technical Field

The present invention relates to a projector.

2. Related Art

A projector is an optical apparatus which modulates light from a light source by an optical modulating element such as a liquid crystal light valve and projects the modulated light to a projection target face such as a screen by a projection optical system to perform display. Recently, there is demand for improvement of display quality of the projector, and thus various methods have been proposed.

For example, in JP-A-9-160030, a projection type liquid crystal display device using a transmission-type liquid crystal panel forming images of red (R), green (G), and blue (B) is disclosed, in which cell thicknesses are different in three sheets of liquid crystal panels, thereby arranging brightness or contrast of each color of finally projected images. In JP-A-2008-46337, a projector system using a reflex-type liquid crystal display device in a vertical alignment mode is disclosed, in which an area where a pre-tilt angle of liquid crystal molecules is different from that of the inside of pixels is provided between adjacent pixels, thereby suppressing a display defect caused by disordered alignment of the liquid crystal molecules called disclination.

For example, when white is displayed on any pixel and black is displayed on a pixel in the vicinity of the white displayed pixel, electric field in a direction substantially parallel to a substrate face of the liquid crystal display, a so-called lateral electric field is generated between two pixels. As described above, when a pattern in which the lateral electric field is generated between the adjacent pixels is displayed, a phenomenon in which a partial area in the pixels around the pattern is colored may occur. In addition, when the pattern is moved, the colored part is moved and recognized, and thus there is a problem in that an observer may feel discomfort. In JP-A-9-160030 and JP-A-2008-46337, when it is difficult to completely prevent the disclination, it is difficult to eliminate the feeling of discomfort.

SUMMARY

An advantage of some aspects of the invention is to provide a projector capable of suppressing a feeling of discomfort caused by coloring around a display pattern.

According to an aspect of the invention, there is provided a projector including: a lighting device that emits light of a plurality of different colors; a plurality of liquid crystal light valves that modulate the light of a plurality of colors; a color synthesizing optical system that synthesizes the color light modulated by the plurality of liquid crystal light valves; and a projection optical system that projects the light synthesized by the color synthesizing optical system to a projection target face, wherein a cell thickness of one liquid crystal light valve modulating light of one color of the plurality of liquid crystal light valves is smaller than a cell thickness of the other liquid crystal light valves modulating the light of other colors, and an alignment state of liquid crystal at the time of applying the maximum gradation voltage is substantially in one liquid crystal light valve and the other liquid crystal light valve.

In the aspect of the invention, "the alignment state of liquid crystal at the time of applying the maximum gradation voltage is substantially the same in one liquid crystal light value and the other liquid crystal light valve" means that a difference between the maximum tilt angle and the minimum tilt angle is equal to or less than 5°, when comparing tilt angles (angle formed by a normal line of a liquid crystal panel and the longest diameter of ovals of liquid crystal molecules) of liquid crystal molecules present at the center in a thickness direction of the liquid crystal layers in one liquid crystal light valve and the other liquid crystal light valves at the time of applying the maximum gradation voltage.

In addition, "the maximum gradation voltage" is voltage when the reflexibility or transmissivity of liquid crystal is substantially the maximum value.

In addition, "the tilt angle of liquid crystal molecules existing at the center in the thickness direction of the liquid crystal layer" is referred to as "an average tilt angle" in the following description.

As a result of intensive study the inventor supposed that the cause of the coloring around the display pattern is as follows.

Generally, since the refractive index anisotropy of liquid crystal has wavelength dispersion, voltage-reflexibility characteristics (V-R characteristics) of liquid crystal or voltage-transmissivity characteristics (V-T characteristics) are different according to wavelengths of light. Accordingly, the voltage when the reflexibility or the transmissivity is the maximum value, that is, the maximum gradation voltage is different according to wavelengths of light. In the projector provided with the plurality of liquid crystal light valves corresponding to different color light, the average tilt angle at the time of applying the maximum gradation voltage is different according to wavelengths (liquid crystal light valves), and thus a degree of occurrence of disclination is different according to wavelengths (liquid crystal light valves). Accordingly, when images of colors formed by the plurality of liquid crystal light valves are overlapped, the disclinations do not completely overlap each other, and thus the area of occurrence of disclination is recognized as coloring.

In the projector according to the aspect of the invention, the cell thickness of one liquid crystal light valve is set smaller than the cell thickness of the other liquid crystal light valves, and the alignment state of liquid crystal at the time of applying the maximum gradation voltage, that is, the average tilt angle is substantially the same in one liquid crystal light valve and the other liquid crystal light valve. For this reason, the degree of occurrence of disclination is substantially the same in all the liquid crystal light valves irrespective of wavelengths. Although the disclination occurs, only color light in which the disclination does not easily occur is not recognized, and it is possible to suppress the feeling of discomfort caused by coloring around the display pattern.

According to another aspect of the invention, there is provided a projector including: a lighting device that emits light of a plurality of different colors; a plurality of liquid crystal light valves that modulate the light of a plurality of colors; a color synthesizing optical system that synthesizes the color light modulated by the plurality of liquid crystal light valves; and a projection optical system that projects the light synthesized by the color synthesizing optical system to a projection target face, wherein refractive index anisotropy of liquid crystal of one liquid crystal light valve modulating light of one color of the plurality of liquid crystal light valves is smaller than refractive index anisotropy of liquid crystal of the other liquid crystal light valves modulating the light of other colors, and an alignment state of liquid crystal at the time of applying the maximum gradation voltage is substantially the same in one liquid crystal light value and the other liquid crystal light valve.

In the projector according to the aspect of the invention, the refractive index anisotropy of liquid crystal of one liquid crystal light valve is set smaller than the refractive index anisotropy of liquid crystal of the other liquid crystal light valves, and the alignment state of liquid crystal at the time of applying the maximum gradation voltage, that is, the average tilt angle is substantially the same in one liquid crystal light valve and the other liquid crystal light valve. For this reason, the degree of occurrence of disclination is substantially the same in all the liquid crystal light valves irrespective of wavelengths. Although the disclination occurs, only color light in which the disclination does not easily occur is not recognized, and it is possible to suppress the feeling of discomfort caused by coloring around the display pattern.

According to still another aspect of the invention, there is provided a projector including: a lighting device that emits light of a plurality of different colors; a plurality of liquid crystal light valves that modulate the light of a plurality of colors; a color synthesizing optical system that synthesizes the color light modulated by the plurality of liquid crystal light valves; and a projection optical system that projects the light synthesized by the color synthesizing optical system to a projection target face, wherein a pre-tilt angle of liquid crystal of one liquid crystal light valve modulating light of one color of the plurality of liquid crystal light valves is smaller than a pre-tilt angle of liquid crystal of the other liquid crystal light valves modulating the light of other colors, and an alignment state of liquid crystal at the time of applying the maximum gradation voltage is substantially the same in one liquid crystal light valve and the other liquid crystal light valve.

In the projector according to the aspect of the invention, the pre-tilt angle of liquid crystal of one liquid crystal light valve is set smaller than the pre-tilt angle of liquid crystal of the other liquid crystal light valves, and the alignment state of liquid crystal at the time of applying the maximum gradation voltage, that is, the average tilt angle is substantially the same in one liquid crystal light valve and the other liquid crystal light valve. For this reason, the degree of occurrence of disclination is substantially the same in all the liquid crystal light valves irrespective of wavelengths. Although the disclination occurs, only color light in which the disclination does not easily occur is not recognized, and it is possible to suppress the feeling of discomfort caused by coloring around the display pattern.

In the projector according to the aspect of the invention, the liquid crystal light valve may include a liquid crystal layer, a pair of substrates pinching the liquid crystal layer, electrodes provided on each of the pair of substrates, and an insulating film provided on the liquid crystal layer side of the electrode in at least one substrate of the pair of substrates, and a film thickness of the insulating film of one liquid crystal light valve modulating light of one color of the plurality of liquid crystal light valves may be smaller than a film thickness of the other liquid crystal light valves modulating the light of other colors.

With such a configuration, since the film thickness of the insulating film of one liquid crystal light valve is smaller than the film thickness of the insulating film of the other liquid crystal light valves, the influence of the lateral electric field on one liquid crystal light valve becomes larger than that of the other liquid crystal light valves. Accordingly, the disclination in one liquid crystal light valve easily occurs, and thus it is possible to match the degree of occurrence of disclination in one liquid crystal light valve with that in the other liquid crystal light valve.

According to still another aspect of the invention, there is provided a projector including: a lighting device that emits light of a plurality of different colors; a plurality of liquid crystal light valves that modulate the light of a plurality of colors; a color synthesizing optical system that synthesizes the color light modulated by the plurality of liquid crystal light valves; and a projection optical system that projects the light synthesized by the color synthesizing optical system to a projection target face, wherein the liquid crystal light valve includes a liquid crystal layer, a pair of substrates pinching the liquid crystal layer, electrodes provided on each of the pair of substrates, and an insulating film provided on the liquid crystal layer side of the electrode in at least one substrate of the pair of substrates, and wherein a film thickness of the insulating film of one liquid crystal light valve modulating light of one color of the plurality of liquid crystal light valves is smaller than a film thickness of the other liquid crystal light valves modulating the light of other colors, and an alignment state of liquid crystal at the time of applying the maximum gradation voltage is substantially the same in one liquid crystal light valve and the other liquid crystal light valve.

In the projector according to the aspect of the invention, the film thickness of one liquid crystal light valve is set smaller than the film thickness of the other liquid crystal light valves, and the alignment state of liquid crystal at the time of applying the maximum gradation voltage, that is, the average tilt angle of one liquid crystal light valve is substantially the same in one liquid crystal light valve and the other liquid crystal light valve. For this reason, the degree of occurrence of disclination is substantially the same in all the liquid crystal light valves irrespective of wavelengths. Although the disclination occurs, only color light in which the disclination does not easily occur is not recognized, and it is possible to suppress the feeling of discomfort caused by coloring around the display pattern.

In the projector according to the aspect of the invention, it is preferable that the plurality of liquid crystal light valves be a red light modulating liquid crystal light valve, a green light modulating liquid crystal light valve, and a blue light modulating liquid crystal light valve, and one liquid crystal light valve be the blue light modulating liquid crystal light valve.

Generally, the maximum gradation voltage for blue light is lower than the maximum gradation voltage for the light of other colors, and the average tilt angle at the time of applying the maximum gradation voltage for blue light is larger than the average tilt angle at the time of applying the maximum gradation voltage for the light of other colors. That is, the angle formed by the horizontal direction of the substrate and the average tilt direction of liquid crystal is larger than the angle of the light of other colors. Accordingly, in the blue light modulating light valve, the disclination does not occur more easily than the red light modulating liquid crystal light valve or the green light modulating liquid crystal light valve. By adjusting the cell thickness of the blue light modulating light valve, the refractive index anisotropy, the pre-tilt angle, and the insulating film thickness, the average tilt angle at the time of applying the maximum gradation voltage in the blue light modulating light valve is matched with the average tilt angle at the time of applying the maximum gradation voltage in the modulating light valve of color of other light, thereby suppressing the phenomenon that the disclination occurrence area is colored with blue.

In the projector according to the aspect of the invention, it is preferable that the liquid crystal light valve be a reflex-type liquid crystal light valve.

When the reflex-type liquid crystal light valve is used, the light passes through the liquid crystal layer twice. Accordingly, even when the refractive index anisotropy of liquid crystal or the cell thickness is the same, a retardation (the product ($\Delta n \cdot d$) of the refractive index anisotropy ($\Delta n$), the cell thickness (d)) in the liquid crystal layer is double the transmission-type liquid crystal light valve. Accordingly, even when the same amount of refractive index anisotropy or cell thickness is changed in the reflex-type liquid crystal light valve and the transmission-type liquid crystal light valve, the change of the average tilt angle at the time of applying the maximum gradation voltage in the reflex-type liquid crystal light valve becomes large. Accordingly, the invention is also applicable to the transmission-type liquid crystal light valve, but is particularly suitable for the reflex-type liquid crystal light valve.

BRIEF DESCRIPTION OF THE DRAWINGS

The invention will be described with reference to the accompanying drawings, wherein like numbers reference like elements.

FIG. 2A and FIG. 2B are cross-sectional views illustrating a configuration around a liquid crystal light valve of the projector.

FIG. 8A and FIG. 8B are diagrams illustrating a cause of the occurrence of a coloring phenomenon around a display pattern.

DESCRIPTION OF EXEMPLARY EMBODIMENTS

First Embodiment

Hereinafter, a first embodiment of the invention will be described with reference to FIG. 1 to FIG. 3.

In the embodiment, a projector provided with three sheets of the reflex-type liquid crystal light valves, that is, a so-called 3-sheet-type liquid crystal projector will be described by way of example.

Figure 1:
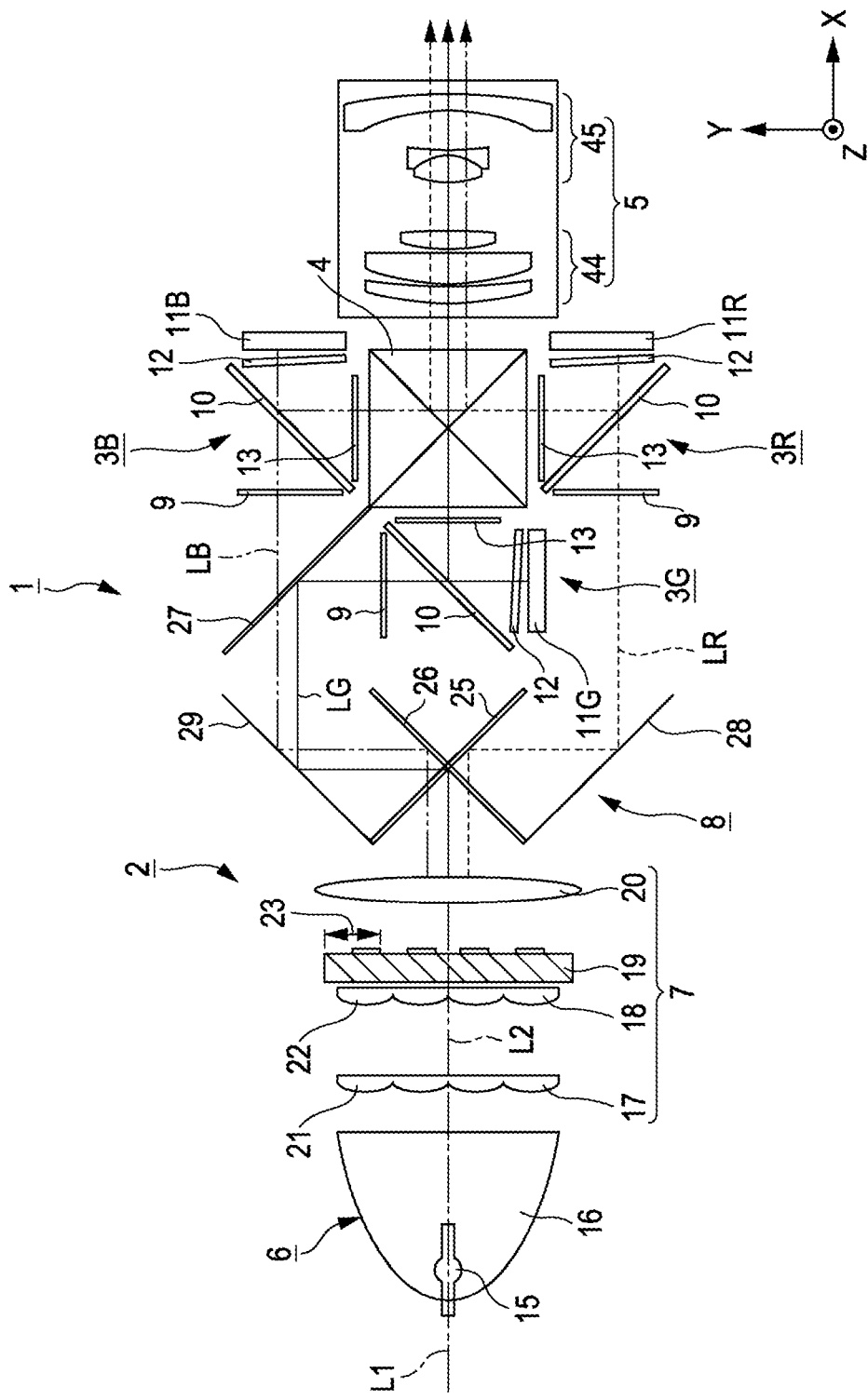
FIG. 1 is a schematic diagram illustrating a configuration of a projector according to a first embodiment of the invention.

FIG. 1 is a schematic diagram illustrating a projector according to the embodiment. FIG. 2A and FIG. 2B are cross-sectional views illustrating a configuration around a liquid crystal light valve. FIG. 3 is a graph illustrating V-R characteristics and average tilt angles at the time of applying the maximum gradation voltage in a red liquid crystal light valve, a green liquid crystal light valve, and a blue liquid crystal light valve in the projector according to the embodiment.

In the following drawings, so that constituent elements may be easily viewed, a scale of the dimensions may be differently indicated according to the constituent elements.

As shown in FIG. 1, the projector 1 of the embodiment includes a lighting device 2 that emits 3-color light formed of red light (R light), green light (G light), and blue light (B light), three sets of liquid crystal light valves 3R, 3G, and 3B that form images based on the color light, a color synthesizing element 4 (color synthesizing optical system) that synthesizes 3-color light, and a projection optical system 5 that projects the synthesized light to a projection target face (not shown) such as a screen. The lighting device 2 includes a light source 6, an integrator optical system 7, and a color separation optical system 8. The liquid crystal light valves 3R, 3G, and 3B includes an incident side polarization plate 9, a polarized beam splitter 10 (hereinafter, referred to as "PBS"), reflex-type liquid crystal cells 11R, 11G, and 11B, an optical compensation plate 12, and an emission side polarization plate 13.

Briefly, the projector 1 operates as follows.

White light emitted from the light source 2 enters the integrator optical system 7. Illuminance of the white light entering the integrator optical system 7 becomes uniform, and the white light is emitted in which the polarization state can be matched with predetermined linearly polarized light. The white light emitted from the integrator optical system 7 is separated into color light of R, G, and B by the color separation optical system 8, and enters the sets of liquid crystal light valves 3R, 3G, and 3B different for each color light. The color light entering the liquid crystal light valves 3R, 3G, and 3B becomes modulation light modulated on the basis of image signals of images to be displayed. The 3-color modulation light emitted from three sets of liquid crystal light valves 3R, 3G, and 3B is synthesized into multi-color light by the color synthesizing element 4, and enters the projection optical system 5. The multi-color light entering the projection optical system 5 is projected to the projection target face such as a screen. As described above, a full-color image is displayed on the projection target face.

Hereinafter, constituent elements of the projector 1 will be described in more detail.

The light source 6 includes a light source lamp 15 and a paraboloidal reflector 16. The light emitted from the light source lamp 15 is reflected in one direction by the paraboloidal reflector 16 to be substantially parallel light flux, and enters the integrator optical system 7 as the light source light. The light source lamp 15 is configured by, for example, a metal halide lamp, a xenon lamp, a high pressure mercury lamp, and a halogen lamp. The reflector may be configured by an oval reflector or a spherical reflector, instead of the paraboloidal reflector 16. A parallelism lens making the light emitted from the reflector parallel according to the shape of the reflector may be used.

The integrator optical system 7 includes a first lens array 17, a second lens array 18, a polarization conversion element 19, and a superposing lens 20. The first lens array 17 includes a plurality of micro-lenses 21 arranged on a face substantially perpendicular to an optical axis L1 of the light source 6. The second lens array 18 includes a plurality of micro-lenses 22 in the same manner as the first lens array 17. The micro-lenses 21 and 22 are arranged in a matrix, and the plan shape on the plane perpendicular to the optical axis L1 is a shape (a substantially rectangular shape) similar to a lighting target area of the liquid crystal cells 11R, 11G, and 11B. The lighting target area is an area in which a plurality of pixels are arranged in matrix in the liquid crystal cells 11R, 11G, and 11B to substantially contribute to display.

The polarization conversion element 19 includes a plurality of polarization conversion units 23. Although not showing a detail structure, each polarization conversion unit 23 includes a polarization separation film (hereinafter, referred to as PBS film), a ½ phase plate, and a reflection mirror. The micro-lenses 21 of the first lens array 17 correspond, one-to-one, to the micro-lenses 22 of the second lens array 18. The micro-lenses 22 of the second lens array 18 correspond, one-to-one, to the polarization conversion units 23 of the polarization conversion unit 19.

The light source light entering the integrator optical system 7 is spatially divided and enters the plurality of micro-lenses 21 of the first lens array 17, and is collected for each light flux entering the micro-lens 21. The light source light collected by each micro-lens 21 forms an image on the micro-lens 22 of the second lens array 18 corresponding to the micro-lens 21. That is, a secondary light source image is formed on each of the plurality of micro-lenses 22 of the second lens array 18. The light from the secondary light source image formed on the micro-lens 22 enters the polarization conversion unit 23 corresponding to the micro-lens 22.

The light entering the polarization conversion unit 23 is divided into P-polarization light and S-polarization light with respect to the PBS film. The divided polarization light (for example, the S-polarization light) is reflected by the reflection mirror, then passes through the ½ phase plate, thus the polarization state is converted, and can be matched with the other side polarization light (for example, the P-polarization light). Herein, the polarization state of the light passing through the polarization conversion unit 23 can be matched with the polarization state of passing through the incident side polarization plate 9 to be described later. The light emitted from the plurality of polarization conversion units 23 is superposed on the lighting target area of the liquid cells 11R, 11G, and 11B by the superposition lens 20. The light flux spatially divided by the first lens array 17 illuminates substantially the whole area of the lighting target area, the illuminance distribution is averaged, and the illuminance on the lighting target area becomes uniform.

The color separation optical system 8 includes a first dichroic mirror 25 having a wavelength selection face, a second dichroic mirror 26, a third dichroic lens 27, a first reflection mirror 28, and a second reflection mirror 29. The first dichroic mirror 25 has spectrum characteristics of reflecting the red light LR and transmitting the green light LG and the blue light LB. The second dichroic mirror 26 has spectrum characteristics of reflecting the red light LR and transmitting the green light LG and the blue light LB. The third dichroic mirror 27 has spectrum characteristics of reflecting the green light LG and transmitting the blue light LB. The first dichroic mirror 25 and the second dichroic mirror 26 are disposed such that the wavelength selection faces thereof are substantially perpendicular to each other and the wavelength selection faces forms an angle of about 45° with respect to the optical axis L2 of the integrator optical system 7.

The red light LR, the green light LG, and the blue light LB included in the light source light entering the color separation optical system 8 are separated as described above, and enter the liquid crystal light valves 3R, 3G, and 3B corresponding to the separated color light. That is, the red light LR passes through the second dichroic mirror 26, is reflected by the first dichroic mirror 25, then is reflected by the first reflection mirror 28, and enters the red liquid crystal light valve 3R. The green light LG passes through the first dichroic mirror 25, is reflected by the second dichroic mirror 26, then is reflected by the second reflection mirror 29, is reflected by the third dichroic mirror 27, and enters the green liquid crystal light valve 3G. The blue light LB passes through the first dichroic mirror 25, is reflected by the second dichroic mirror 26, then is reflected by the second reflection mirror 29, passes through the third dichroic mirror 27, and enters the blue liquid crystal light valve 3B.

The red liquid crystal light valve 3R, the green liquid crystal light valve 3G, and the blue liquid crystal light valve 3B have the same configuration. Herein, a configuration of the green liquid crystal light valve 3G will be described as a representative of the liquid crystal light valve.

The green liquid crystal light valve 3G includes the incident side polarization plate 9, the PBS 10, the green light liquid crystal cell 11G, the optical compensation plate 12, and the emission side polarization plate 13. The green light LG that is a part of the light source light enters the incident side polarization plate 9. The incident side polarization plate 9 allows linear polarization light to pass, and a transmission axis is set such that the P-polarization light with respect to the polarization separation face of the PBS 10 to be described later. Hereinafter, the P-polarization light with respect to the polarization separation face of the PBS 10 is merely referred to as the P-polarization light, and the S-polarization light with respect to the polarization separation face of the PBS 10 is merely referred to as the S-polarization light. As described above, the polarization state of the light source light passing through the integrator optical system 7 can be matched with the P-polarization light, and most of the light LG enters the PBS 10 through the incident side polarization plate 9.

The PBS 10 of the embodiment is a wire grid type PBS, and is configured by, for example, a glass substrate and a plurality of metal wires formed thereon (not shown). All the plurality of metal wires extend in one direction (Z direction), and are separated parallel to each other and are formed on the glass substrate. A main face of the glass substrate on which the plurality of metal wires are formed becomes the polarization separation face, the extending direction of the plurality of metal wires is the reflection axis direction, and the arrangement direction of the plurality of metal wires is the transmission axis direction. The polarization separation face forms an angle of about 45° with respect to the center axis of the green light LG entering the polarization separation face. The S-polarization light, the polarization direction of which coincides with the reflection axis, of the green light LG entering the polarization separation face is reflected on the polarization separation face, and the P-polarization light, the polarization direction of which coincides with the transmission axis direction, passes through the polarization separation face. Since the green light LG becomes substantially the P-polarization light by the polarization conversion element 19 of the integrator optical system 7, the green light LG passes through the polarization separation face of the PBS 10, and enters the green light liquid crystal cell 11G. The incident side polarization plate 9 and the emission side polarization plate 13 are configured by a wire grid type polarization plate.

The green light liquid crystal cell 11G of the embodiment is a reflex type liquid crystal cell, and a liquid crystal mode is a vertical alignment mode. As shown in FIG. 2B, the green light liquid crystal cell 11G includes a TFT array substrate 31 and an opposed substrate 32 which are opposed to each other, and a liquid crystal layer 33 interposed between two substrates. The liquid crystal layer 33 is formed of a liquid crystal material having negative permittivity anisotropy, and the refractive index anisotropy $\Delta n$ is 0.12, and the permittivity anisotropy $\Delta \epsilon$ is $-5.5$.

The optical compensation plate 12 is provided between the PBS 10 and the green light liquid crystal cell 11G. The green light LG passing through the PBS 10 sequentially passes through the optical compensation plate 12 and the opposed substrate 32, enters the liquid crystal layer 33, then is reflected on the TFT array substrate 31, and is turned back. The green light LG is modulated to modulation light while passing through the liquid crystal layer 33, and sequentially passes through the opposed substrate 32 and the optical compensation plate 12.

On the substrate main body 35 constituting the TFT array substrate 31, a plurality of gate lines disposed parallel to each other and a plurality of source lines disposed parallel to each other are disposed to be perpendicular, and pixel electrode 36 are provided through a TFT provided in the vicinity of intersection points of the gate lines and the source lines. In FIG. 2A and FIG. 2B, constituent elements on the side lower than the pixel electrodes 36, such as the gate lines, the source lines, and the TFTs are not shown. The pixel electrode 36 is configured by metal with high light reflexibility such as aluminum, silver, and alloy thereof, and serves as a reflection electrode. Meanwhile, a common electrode 39 formed of a transparent conductive material such as indium tin oxide (hereinafter, referred to as ITO) is provided on the substrate main body 38 constituting the opposed substrate 32.

An alignment film 37 is formed on the pixel electrodes 36 of the TFT array substrate 31. Similarly, an alignment film 40 is formed on the common electrode 39 of the opposed substrate 32. The alignment films 37 and 40 are formed by vacuum deposition of silicon oxide ($SiO_2$). A vacuum degree of deposition at the time of vacuum deposition is $5 \times 10^3$ Pa, and a substrate temperature is 100° C. To apply anisotropy to the alignment film 37 and 40, deposition is performed in a direction of inclining from the substrate face by 45°. Accordingly, a column (pillar-shaped structure) of silicon oxide grows in a direction inclining from the substrate face by 70° in the same orientation as the deposition orientation. The alignment film 37 on the TFT array substrate 31 and the alignment film 40 on the opposed substrate 32 are disposed such that the alignment directions thereof are semi-parallel. The liquid crystal molecules 33B of the liquid crystal layer 33 are aligned such that the longest diameter direction of the ovals forms an angle of 86.5° from the substrate face in the orientation of silicon oxide by the alignment films 37 and 40. That is, the pre-tilt angle (an angle formed by the normal line of the substrates 31 and 32 and the longest diameter direction of the ovals of the liquid crystal molecules 33B) of the liquid crystal layer 33 is set to 3.5°. When a work function difference of a material of the pixel electrode 36 and a material of the common electrode 39 is a cause of flicker or burn-in, an insulating film may be provided between the pixel electrodes 36 and the alignment film 37.

The optical compensation plate 12 has negative refractive index anisotropy, and is formed by a C plate having an optical axis along the thickness direction. The refractive index of the optical compensation plate 12 is nx=ny>nz, and a value of a retardation in the thickness direction is 220 nm ((nx+ny)/2−nz)·dc. In the formula, dc is a thickness of the optical compensation plate 12, each of nx and ny represent a main refractive index in the plane direction of the optical compensation plate 12, and nz represents a main refractive index in the optical axis direction. The optical compensation plate 12 is provided in a posture inclined by an angle α with respect to the green light liquid crystal cell 11G, thereby raising contrast of the display. For this reason, it is preferable that an inclination mechanism for inclining the optical compensation plate 12 be provided.

As described above, the red liquid crystal light valve 3R, the green liquid crystal light valve 3G, and the blue liquid crystal light valve 3B have the common basic configuration, but are different in the following parts.

That is, in the embodiment, the cell thickness of liquid crystal in one liquid crystal light valve is different from the cell thickness of liquid crystal in the other liquid crystal light valves. Specifically, the cell thickness dB of the liquid crystal cell 11B of the blue liquid crystal light valve 3B shown in FIG. 2A is set smaller than the cell thickness dR of the liquid crystal cell 11R of the red liquid crystal light valve 3R and the cell thickness dG of the liquid crystal cell 11G of the green liquid crystal light valve 3G shown in FIG. 2B. For example, the cell thickness dB of the blue light liquid crystal cell 11B is 1.7 μm, the cell thickness dR of the red light liquid crystal cell 11R is 2.1 μm, and the cell thickness dG of the green light liquid crystal cell 11G is 2.1 μm. To restrict the cell thicknesses of the liquid crystal light valves 3R, 3G, and 3B, a spherical gap member 41 with a diameter of 1.7 μm is used as the blue light liquid crystal cell 11B, and a spherical gap member 42 with a diameter of 2.1 μm is used as the red light liquid crystal cell 11R and the green light liquid crystal cell 11G.

As shown in FIG. 1, the color synthesizing element 4 is configured by a dichroic prism. The dichroic prism has a structure in which four triangular prisms are bonded to each other. A face bonded to the triangular prisms is an inner face of the dichroic prism. In the inner face of the dichroic prism, a mirror face reflecting the red light LR and allowing the green light LG to pass and a mirror face reflecting the blue light LB and allowing the green light LG to pass are formed to be perpendicular. The green light LG entering the dichroic prism straightly goes to the mirror face and is emitted. The red light LR and the blue light LB entering the dichroic prism are selectively reflected or transmitted on the mirror face, and are emitted in the same direction as the emission direction of the green light LG. As described above, three colors of light (images) are superposed and synthesized, and the synthesized color light is enlarged and projected on the screen 7 by the projection optical system 5. The projection optical system 5 includes a first lens group 44 and a second lend group 45.

In the liquid crystal valve of the projector, a pattern (black and white pattern) in which a lateral electric field is generated between the adjacent pixels may be displayed. For example, as shown in FIG. 8A and FIG. 8B, in the liquid crystal light valve of the normal-black mode, the case is that the black display pixel PX1 to which 0 V is applied and the white display pixel PX2 to which 5 V is applied are adjacent. In this case, at the boundary between the black display pixel PX1 and the white display pixel PX2, disclination D (defect in alignment of liquid crystal) occurs. This is a phenomenon in which potentials of the adjacent pixels PX1 and PX2 are different, the lateral electric field, the liquid crystal molecules 33B are turned in an unintentional direction by the influence of the lateral electric field, the liquid crystal molecules 33B are aligned in a direction parallel or perpendicular to the optical axis of the polarization plate, and the display of the part becomes dark. The disclination tends to worsen as the lateral electric field between the adjacent pixels is becomes larger. In addition, in a case of liquid crystal of the vertical alignment mode, the influence of the lateral electric field is easily received even when the pre-tilt angle becomes small (the alignment of the liquid crystal molecules is close in a direction perpendicular to the substrate face).

When the red liquid crystal light valve, the green liquid crystal light valve, and the blue liquid crystal light valve have the same configuration (the cell thickness, the liquid crystal material, and the like), the liquid crystal has wavelength dispersion of a refractive index in which a refractive index on the short wavelength side is larger than a refractive index on the long wavelength side, thus the light on the short wavelength side satisfies the optical condition of $\Delta n \cdot d = \lambda/2$ with lower voltage than the light on the long wavelength side, and the light on the long wavelength side gets saturation voltage with higher voltage than the light on the short wavelength side. For this reason, the intensity of the lateral electric field generated when the black and white pattern described above is displayed is low in the short wavelength (blue light) liquid crystal light valve and is high in the long wavelength (green light and red light) liquid crystal light valve. For this reason, in the short wavelength (blue light) liquid crystal light valve, disclination does not occur more easily than the long wavelength (green light and red light) liquid crystal light valve.

From the reason described above, when the pattern in which the lateral electric field is generated between the adjacent pixels (FIG. 8A→FIG. 8B), the disclination D occurring in the adjacent pixels is not viewed in the blue liquid crystal light valve, and is easily viewed in the green liquid crystal light valve and the red liquid crystal light valve. For this reason, the area corresponding to the position of the disclination occurring in the green liquid crystal light valve and the red liquid crystal light valve is colored with blue, the colored part is moved, and thus a problem occurs in which a feeling of discomfort is caused for the observer.

Figure 3:
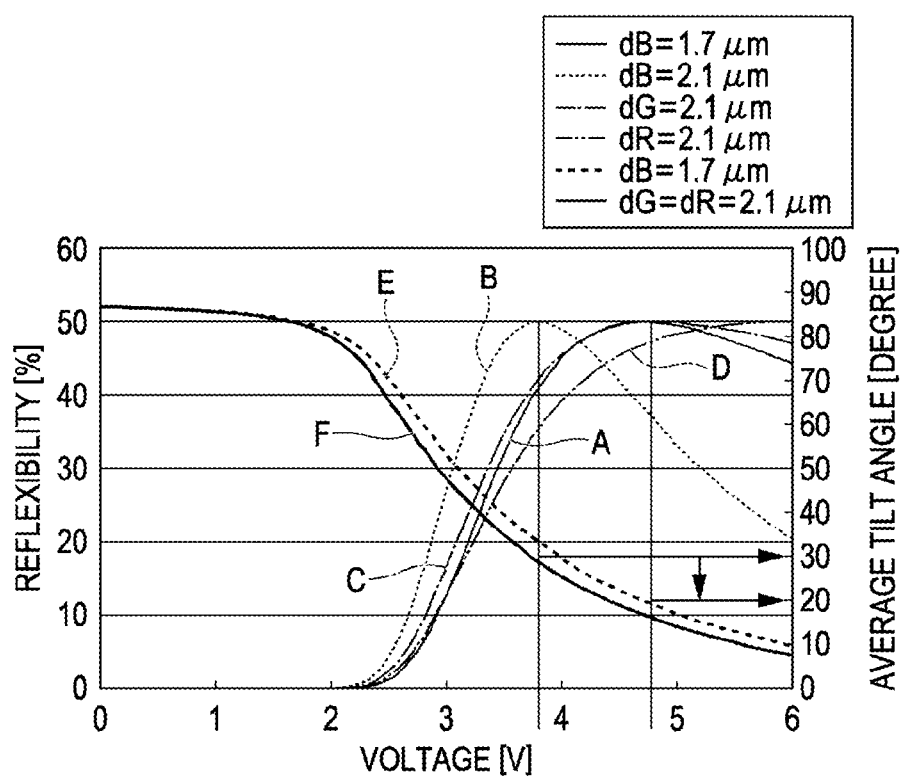
FIG. 3 is a graph illustrating a V-R characteristic in red light, green light, and blue light, and an average tilt angle when a maximum gradation voltage is applied in the projector.

FIG. 3 is graph illustrating a relationship (V-R characteristics) between voltage and reflexibility with respect to liquid crystal, and a relationship (V-θ characteristics) between voltage and an average tilt angle, and the horizontal axis is voltage [V], the left vertical axis is reflexibility [%], and the right vertical axis is an average tilt angle [°]. The characteristic curve of the reference sign A indicates V-R characteristics of the blue liquid crystal light valve of a cell thickness dB=1.7 μm, the characteristic curve of the reference sign B indicates V-R characteristics of the blue liquid crystal light valve of a cell thickness dB=2.1 μm, the characteristic curve of the reference sign C indicates V-R characteristics of the green liquid crystal light valve of a cell thickness dG=2.1 μm, the characteristic curve of the reference sign D indicates V-R characteristics of the red liquid crystal light valve of a cell thickness dR=2.1 μm, the characteristic curve of the reference sign E indicates V-θ characteristics of the blue liquid crystal light valve of a cell thickness dB=1.7 μm, and the characteristic curve of the reference sign F indicates V-θ characteristics of the green liquid crystal light valve of a cell thickness dG=dR=2.1 μm.

When comparing the V-R characteristics (curves B, C, and D) when the cell thicknesses of all the liquid crystal light valves are the same, that is, when the cell thicknesses dR, dG, and dB are 2.1 μm, the V-R characteristics of the blue liquid crystal light valve are greatly apart as compared with the V-R characteristics of the green liquid crystal light valve and the red liquid crystal light valve. In the maximum gradation voltage when the reflexibility is substantially the maximum value, the maximum gradation voltage VBmax of the blue light crystal light valve is 3.8 V, and the maximum gradation voltage VGmax of the green liquid crystal light valve and the maximum gradation voltage VRmax of the red liquid crystal light valve are 4.8 V. In addition, the reflexibility of the red liquid crystal light valve actually takes the maximum value with voltage higher than 4.8 V, but it is considered that the reflexibility is substantially saturated in the area in the vicinity of 4.8 V, and thus it is matched with the maximum gradation voltage VGmax of the green liquid crystal light valve.

When the cell thickness dB of the blue liquid crystal light valve is changed from 2.1 μm to 1.7 μm, the V-R characteristics (curve A) of the blue liquid crystal light valve are shifted to the high voltage side as compared with the case (curve B) of the cell thickness dB=2.1 μm. As a result, the V-R characteristics (curve A) of the blue liquid crystal light valve of the cell thickness dB=1.7 μm are substantially the same as the V-R characteristics of the green liquid crystal light valve of the cell thickness dG=2.1 μm. Accordingly, the maximum gradation voltage VBmax of the blue liquid crystal light valve can be changed from 3.8 V to 4.8 V equal to that of the other liquid crystal light valves.

In this case, paying attention to the V-θ characteristics of the liquid crystal light valves, the average tilt angle at the time of applying the maximum gradation voltage (4.8 V) is about 20° from the V-θ (curve E) of the blue liquid crystal light valve of the cell thickness dB=1.7 μm. Meanwhile, the average tilt angle at the time of applying the maximum gradation voltage (4.8 V) is about 17° from the V-θ (curve F) of the green liquid crystal light valve and the red liquid crystal light valve of the cell thickness dG=dR=2.1 μm. The magnitude of the average tilt angle corresponds to ease of occurrence of disclination, the liquid crystal molecules are easily affected by the lateral electric field as much as the average tilt angle becomes small, and the disclination easily occurs.

As described above, in all the liquid crystal light valves, the average tilt angles of liquid crystal at the time of applying the maximum gradation voltage, that is, the alignment states of liquid crystal are substantially the same, and thus the ease of occurrence of disclination is substantially the same. That is, in the embodiment, the cell thickness dB of the liquid crystal cell 11B of the blue liquid crystal light valve 3B is set smaller than the cell thicknesses dG and dR of the liquid crystal cells 11G and 11R of the other liquid crystal light valves 3G and 3R, and the average tilt angle at the time of applying the maximum gradation voltage, that is, the alignment state of liquid crystal can be matched with all the liquid crystal light valves. Accordingly, the ease of occurrence of disclination is the same in all the liquid crystal light valves 3R, 3G, and 3B, and thus it is possible to eliminate the feeling of discomfort caused by blue coloring, for example, even when disclination occurs when the black and white pattern is displayed.

Second Embodiment

Hereinafter, a second embodiment of the invention will be described with reference to FIG. 4A to FIG. 5.

A basic configuration of a projector of the embodiment is the same as that of the first embodiment, a unit matching the liquid crystal alignment state at the time of applying the maximum gradation voltage with respect to all the liquid crystal light valves is different from that of the first embodiment.

Figure 4A:
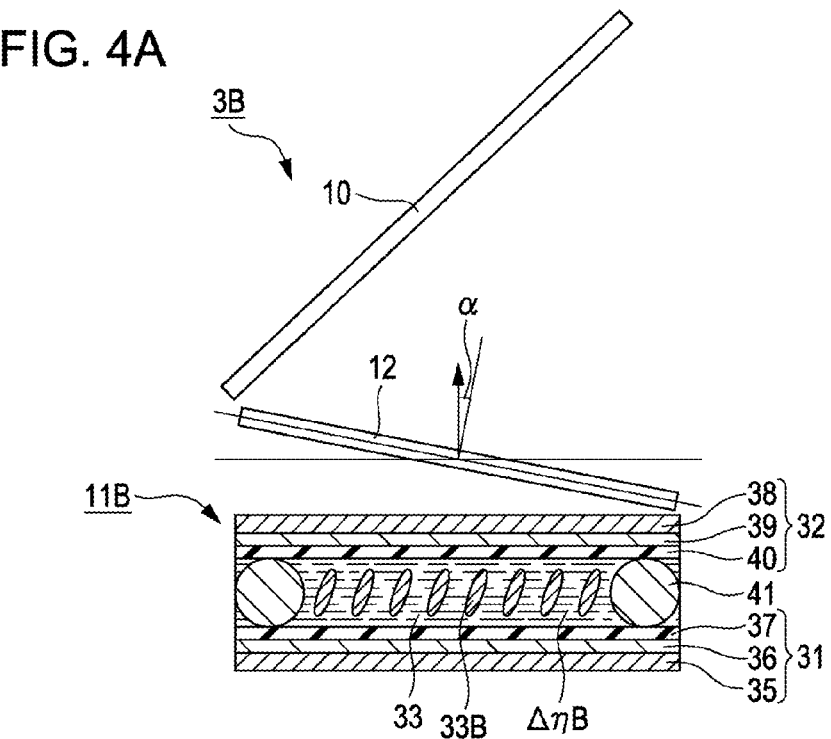
FIG. 4A and FIG. 4B are cross-sectional views illustrating a configuration around a liquid crystal light valve of a projector according to a second embodiment.
Figure 4B:
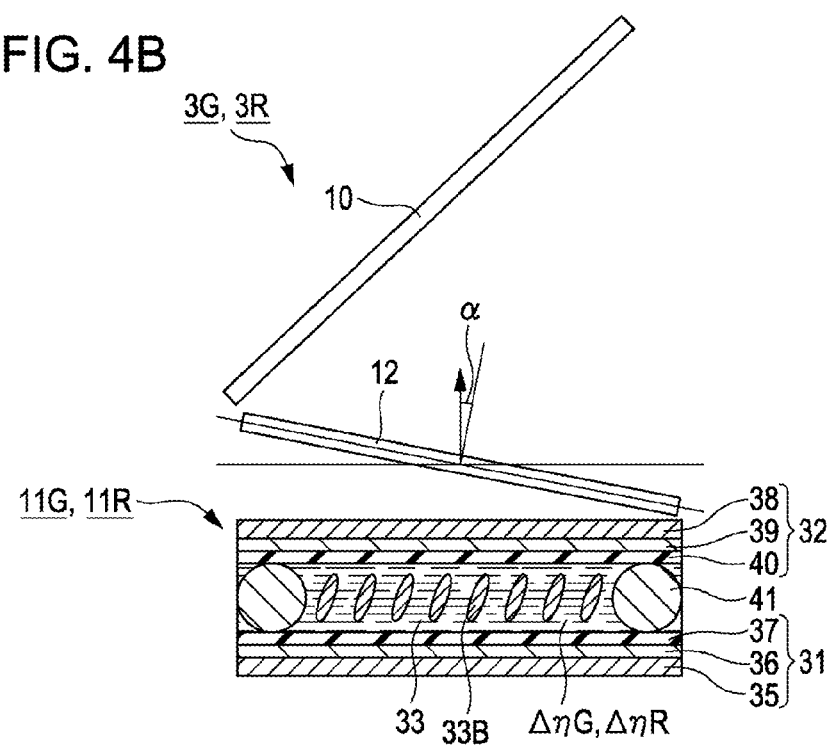

FIG. 4A and FIG. 4B are cross-sectional views illustrating a configuration around the liquid crystal light valve. FIG. 5 is a graph illustrating V-R characteristics and average tilt angles at the time of applying the maximum gradation voltage in the red liquid crystal light valve, the green liquid crystal light valve, and the blue liquid crystal light valve, in the projector of the embodiment.

In FIG. 4, the same reference numerals and signs are given to the common constituent elements with FIG. 2 used in the first embodiment, and the detailed description is not repeated.

In the embodiment, a refractive index anisotropy Δn of liquid crystal of the liquid crystal light valve in one image forming optical system is different from a refractive index anisotropy Δn of liquid crystal of the liquid crystal light valve in the other image forming optical system. Specifically, a refractive index anisotropy ΔnB of the liquid crystal layer 33 of the liquid crystal cell 11R of the blue liquid crystal light valve 3B shown in FIG. 4A is set smaller than a refractive index anisotropy ΔnR of the liquid crystal layer 33 of the liquid crystal cell 11R of the red liquid crystal light valve 3R and a refractive index anisotropy ΔnG of the liquid crystal layer 33 of the liquid crystal cell 11G of the green liquid crystal light valve 3G shown in FIG. 4B. For example, the refractive index anisotropy ΔnB of the liquid crystal layer 33 of the blue light liquid crystal cell 11B is set to 0.10, the refractive index anisotropy ΔnR of the liquid crystal layer 33 of the red light liquid crystal cell 11R is set to 0.12, and the refractive index anisotropy ΔnG of the liquid crystal layer 33 of the green light liquid crystal cell 11G is set to 0.12.

To restrict the refractive index anisotropies ΔnR, ΔnG, and ΔnB of the liquid crystal layers 33 of the liquid crystal cells 11R, 11G, and 11B, a liquid crystal material different in the blue light liquid crystal cell 11B, the red liquid crystal cell 11R, and the green light liquid crystal cell 11G is used. In addition, in all the liquid crystal light valves, the cell thicknesses are the same as 2.1 μm, and the permittivity anisotropies Δϵ of liquid crystal are the same as −5.5. In addition, it is preferable that each difference of the pre-tilt angles among the liquid crystal cells 11R, 11G, and 11B be controlled within 5°.

Figure 5:
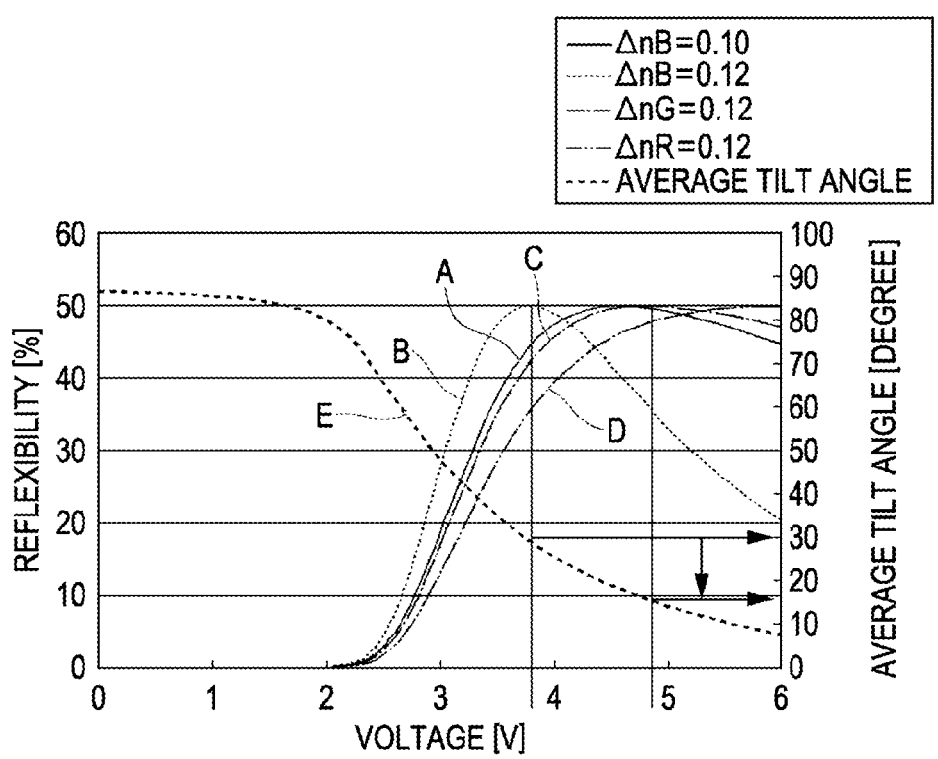
FIG. 5 is a graph illustrating a V-R characteristic in red light, green light, and blue light, and an average tilt angle when a maximum gradation voltage is applied in the projector.

FIG. 5 is a graph illustrating a relationship (V-R characteristics) between voltage and reflexibility in liquid crystal and a relationship (V-θ characteristics) between voltage and an average tilt angle, and the horizontal axis is voltage [V], the left vertical axis is reflexibility [%], and the right vertical axis is an average tilt angle [°]. The characteristic curve of the reference sign A indicates V-R characteristics of the blue liquid crystal light valve of a refractive index anisotropy ΔnB=0.10, the characteristic curve of the reference sign B indicates V-R characteristics of the blue liquid crystal light valve of a refractive index anisotropy ΔnB=0.12, the characteristic curve of the reference sign C indicates V-R characteristics of the green liquid crystal light valve of a refractive index anisotropy ΔnG=0.12, the characteristic curve of the reference sign D indicates V-R characteristics of the red liquid crystal light valve of a refractive index anisotropy ΔnR=0.12, and the characteristic curve of the reference sign E indicates V-θ characteristics of the green liquid crystal light valve of a refractive index anisotropy ΔnB=ΔnG=ΔnR=0.12.

When comparing the V-R characteristics (curves B, C, and D) when the refractive index anisotropies Δn of all the liquid crystal light valves are the same, that is, when the refractive index anisotropies Δn are 0.12, the V-R characteristics of the blue liquid crystal light valve is greatly apart as compared with the V-R characteristics of the green liquid crystal light valve and the red liquid crystal light valve. In the maximum gradation voltage when the reflexibility is substantially the maximum value, the maximum gradation voltage VBmax of the blue light crystal light valve is 3.8 V, and the maximum gradation voltage VGmax of the green liquid crystal light valve and the maximum gradation voltage VRmax of the red liquid crystal light valve are 4.8 V. In addition, the reflexibility of the red liquid crystal light valve actually takes the maximum value with voltage higher than 4.8 V, but it is considered that the reflexibility is substantially saturated in the area in the vicinity of 4.8 V, and thus it is matched with the maximum gradation voltage VGmax of the green liquid crystal light valve.

When the refractive index anisotropy ΔnB of the blue liquid crystal light valve is changed from 0.12 to 0.10, the V-R characteristics (curve A) of the blue liquid crystal light valve are shifted to the high voltage side as compared with the case (curve B) of the refractive index anisotropy ΔnB=0.12. As a result, the V-R characteristics (curve A) of the blue liquid crystal light valve of the refractive index anisotropy ΔnB=0.10 are substantially the same as the V-R characteristics (curve C) of the green liquid crystal light valve of the refractive index anisotropy ΔnG=0.12. Accordingly, the maximum gradation voltage VBmax of the blue liquid crystal light valve can be changed from 3.8 V to 4.8 V equal to that of the other liquid crystal light valves.

In this case, paying attention to the V-θ characteristics of the liquid crystal light valves, from the V-θ characteristics (curve E) shown by the curve E, the average tilt angle of the blue liquid crystal light valve is about 30° when the maximum gradation voltage is 3.8 V, but the average tilt angles of the liquid crystal light valves are the same as about 17° when the maximum gradation voltages are the same as 4.8 V. As described above, in all the liquid crystal light valves, the average tilt angles are substantially the same, and thus the ease of occurrence of disclination is substantially the same. That is, in the embodiment, the refractive index anisotropy ΔnB of the liquid crystal cell of the blue liquid crystal light valve is set smaller than the refractive index anisotropies ΔnG and ΔnR of the liquid crystal cells of the other liquid crystal light valves, and the average tilt angle at the time of applying the maximum gradation voltage, that is, the alignment state of liquid crystal can be matched with all the liquid crystal light valves. Accordingly, the ease of occurrence of disclination is the same in all the liquid crystal light valves, and thus it is possible to eliminate the feeling of discomfort caused by blue coloring, for example, even when disclination occurs when the black and white pattern is displayed.

In the embodiment, the refractive index anisotropy ΔnB of liquid crystal of the blue liquid crystal cell 11B is small, and thus it is possible to improve light resistance of the blue liquid crystal cell 11B.

Third Embodiment

Hereinafter, a third embodiment of the invention will be described with reference to FIG. 6A and FIG. 6B.

A basic configuration of a projector of the embodiment is the same as that of the first and second embodiments, a unit matching the liquid crystal alignment state at the time of applying the maximum gradation voltage with respect to all the liquid crystal light valves is different from that of the first and second embodiments.

Figure 6A:
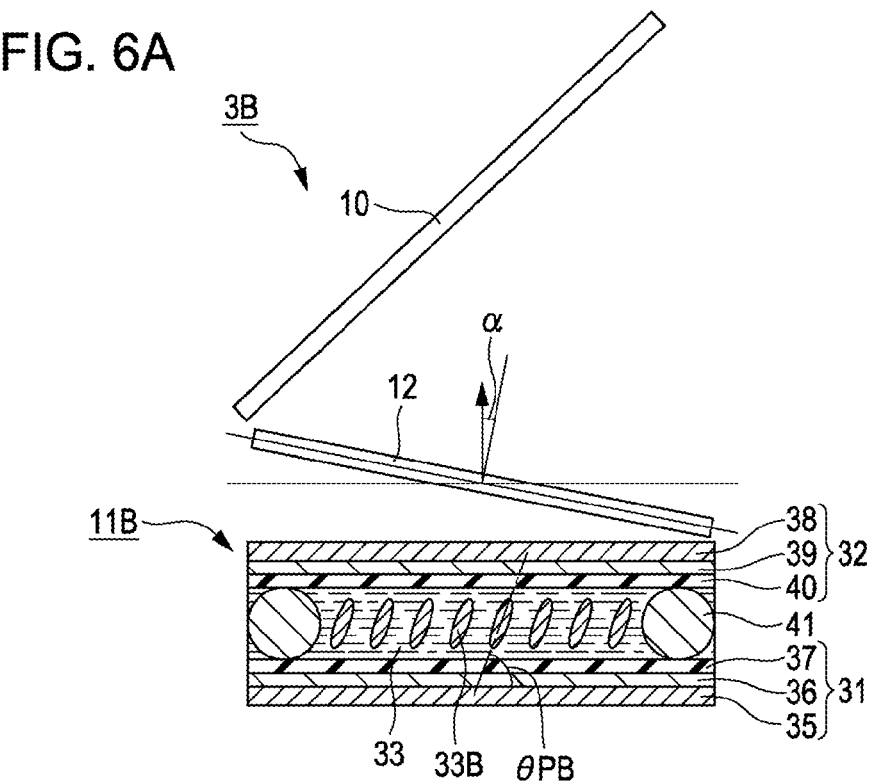
FIG. 6A and FIG. 6B are cross-sectional views illustrating a configuration around a liquid crystal light valve of a projector according to a third embodiment.
Figure 6B:
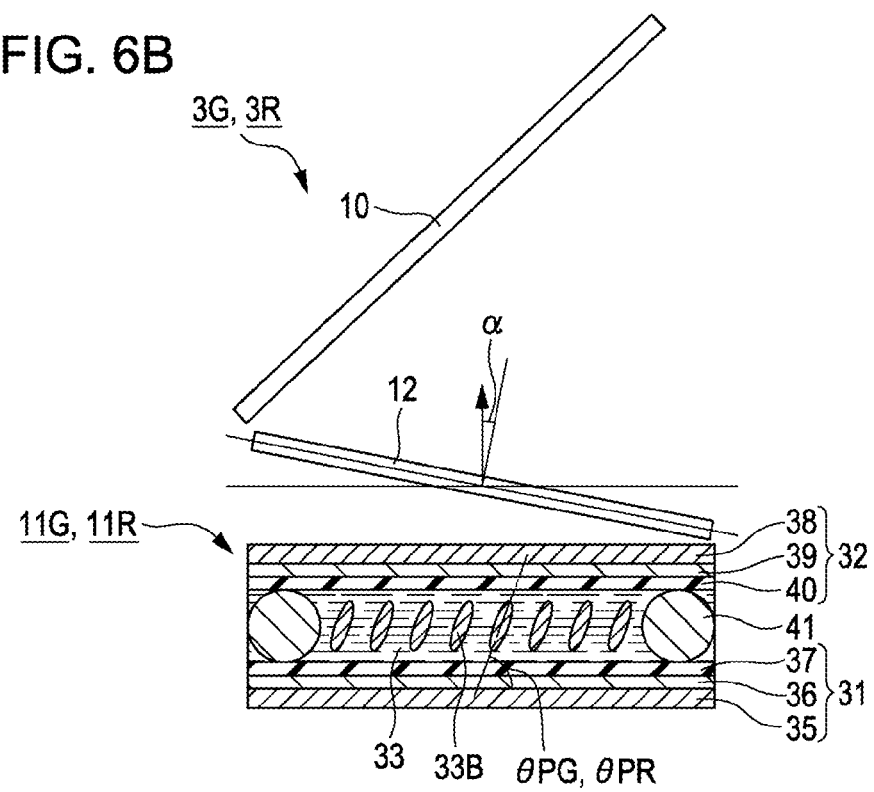

FIG. 6A and FIG. 6B are cross-sectional views illustrating a configuration around the liquid crystal light valve.

In FIG. 6A and FIG. 6B, the same reference numerals and signs are given to the common constituent elements with FIG. 2 used in the first embodiment, and the detailed description is not repeated.

In the embodiment, a pre-tilt angle θp of liquid crystal of the liquid crystal cell in one liquid crystal light valve is different from a pre-tilt angle θp of liquid crystal of the liquid crystal cell in the other liquid crystal light valves. Specifically, a pre-tilt angle θpB of the liquid crystal layer 33 of the liquid crystal cell 11B of the blue liquid crystal light valve 3B shown in FIG. 6A is set smaller than a pre-tilt angle θpR of the liquid crystal layer 33 of the liquid crystal cell 11R of the red liquid crystal light valve 3R and a pre-tilt angle θpG of the liquid crystal layer 33 of the liquid crystal cell 11G of the green liquid crystal light valve 3G shown in FIG. 6B. For example, the pre-tilt angle θpB of the blue light liquid crystal cell 11B is 2°, the pre-tilt angle θpR of the red light liquid crystal cell 11R is 3.5°, and the pre-tilt angle θpG of the green light liquid crystal cell 11G is 3.5°.

To restrict the pre-tilt angles of the liquid crystal layers 33 of the liquid crystal light valves 3R, 3G, and 3B, there is a difference in an oblique evaporation condition when forming the alignment films 37 and 40, in the blue light liquid crystal cell 11B, the red light liquid crystal cell 11R, and the green light liquid crystal cell 11G. In addition, in all the liquid crystal light valves 3R, 3G, and 3B, the cell thicknesses are the same as 2.1 µm, the refractive index anisotropies Δn are the same as 0.12, and the permittivity anisotropies Δε of liquid crystal are the same as −5.5.

In the embodiment, the pre-tilt angle θpB of the liquid crystal cell 11B of the blue liquid crystal light valve 3B is set lower than the pre-tilt angles θpG and θpR of the other liquid crystal light valves 3G and 3R, thus the liquid crystal alignment in the blue liquid crystal light valve 3B is easily affected by the lateral electric field, and the average tilt angles at the time of applying the maximum gradation voltage, that is, the alignment states of liquid crystal can be substantially the same in all the liquid crystal light valves 3R, 3G, and 3B. Accordingly, the ease of occurrence of disclination is the same in all the liquid crystal light valves 3R, 3G, and 3B, and thus it is possible to eliminate the feeling of discomfort caused by blue coloring, for example, even when disclination occurs when the black and white pattern is displayed.

Fourth Embodiment

Hereinafter, a fourth embodiment of the invention will be described with reference to FIG. 7A to FIG. 7C.

A basic configuration of a projector of the embodiment is the same as that of the first and second embodiments, a unit matching the liquid crystal alignment state at the time of applying the maximum gradation voltage with respect to all the liquid crystal light valves is different from that of the first and second embodiment.

Figure 7A:
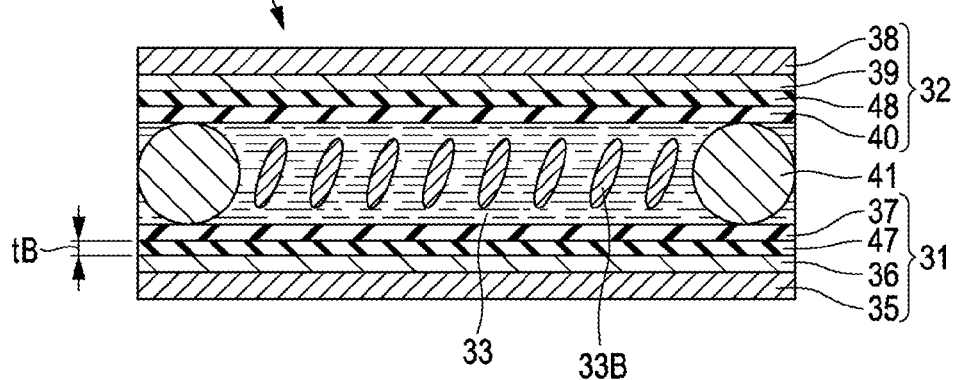
FIG. 7A to FIG. 7C are cross-sectional views illustrating a configuration around a liquid crystal light valve of a projector according to a fourth embodiment.
Figure 7B:
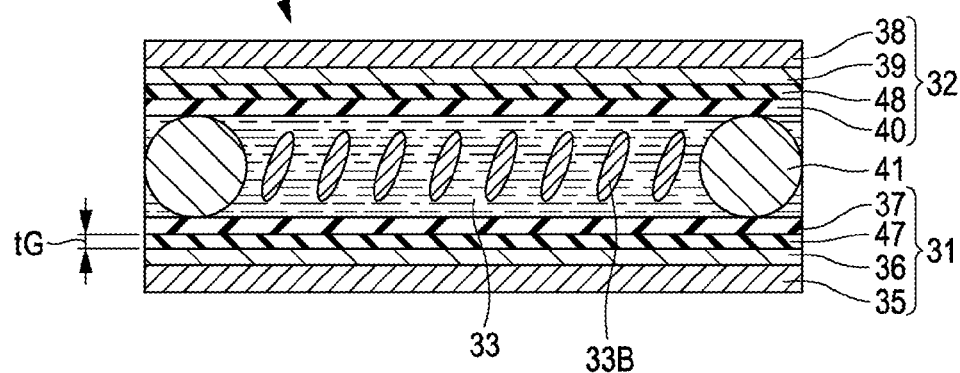
Figure 7C:
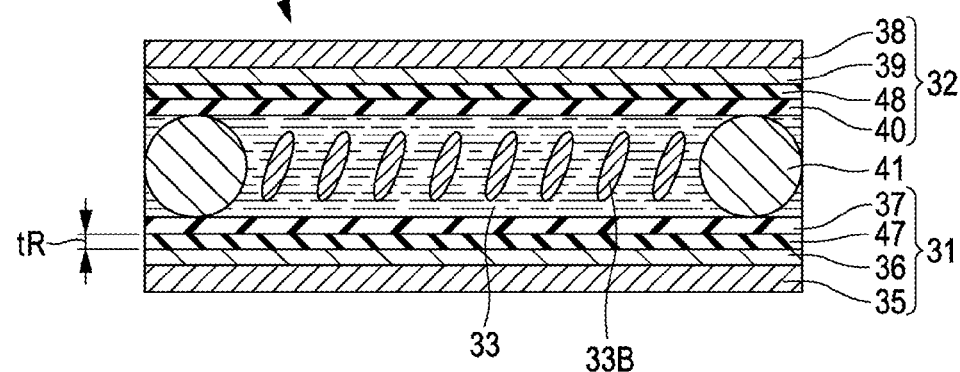

FIG. 7A to FIG. 7C are cross-sectional views illustrating a configuration around the liquid crystal light valve.

In FIG. 7A to FIG. 7C, the same reference numerals and signs are given to the common constituent elements with FIG. 2 used in the first embodiment, and the detailed description is not repeated.

In the embodiment, as shown in FIG. 7A to FIG. 7C, an insulating film 47 formed of, for example, a silicon oxide film and a silicon nitride film is provided between the pixel electrode 36 on the TFT array substrate 31 and the alignment film 37. There is a difference among the film thicknesses of the insulating films 47 of the liquid crystal cells 11R, 11G, and 11B in the liquid crystal light valve 3R, 3G, and 3B. Specifically, the film thickness tB of the insulating film 47 of the blue light liquid crystal cell 11B shown in FIG. 7A is set to 100 nm, the film thickness tG of the insulating film 47 of the green light liquid crystal cell 11G shown in FIG. 7B is set to 350 nm, and the film thickness tR of the insulating film 47 of the red light liquid crystal cell 11R shown in FIG. 7C is set to 375 nm.

Herein, to match the average tilt angle at the time of applying the maximum gradation voltage even between the green light liquid crystal cell 11G and the red light liquid crystal cell 11R, the insulating film thickness tG of the green light liquid crystal cell 11G and the insulating film thickness tR of the red liquid crystal cell 11R are changed. When the average tilt angle at the time of applying the maximum gradation voltage is unchanged, the insulating film thickness tG of the green light liquid crystal cell 11G and the insulating film thickness tR of the red light liquid crystal cell 11R may not be necessarily changed.

The pre-tilt angle θpB of the liquid crystal layer 33 of the blue light liquid crystal cell 11B shown in FIG. 7A is set to 2.5°, the pre-tilt angle θpG of the liquid crystal layer 33 of the green light liquid crystal cell 11G shown in FIG. 7B is set to 3.5°, and the pre-tilt angle θpR of the liquid crystal layer 33 of the red light liquid crystal cell 11R shown in FIG. 7C is set to 3.5°.

In all the liquid crystal cells 11R, 11G, and 11B, the cell thicknesses are the same as 2.2 µm, the refractive index anisotropies Δn of liquid crystal are the same as 0.12, and the permittivity anisotropies Δε are the same as −5.4.

An insulating film 48 formed of a silicon oxide film and a silicon nitride film is provided between the common electrode 39 on the opposed substrate 32 and the alignment film 40. In the example, the insulating film thickness 47 on the TFT array substrate 31 is changed according to the liquid crystal cells 11R, 11G, and 11B, but the film thickness of the insulating film 48 on the opposed substrate 32 may be changed by the liquid crystal cells 11R, 11G, and 11B, instead of the configuration or in addition to the configuration.

In the embodiment, the pre-tilt angle θpB of the blue light liquid crystal cell 11B is set smaller than the pre-tilt angles θpG and θpR of the other liquid crystal cells 11G and 11R, the film thickness tB of the insulating film 47 of the blue light liquid crystal cell 11B is set smaller than the film thicknesses tG and tR of the insulating films 47 of the other liquid crystal cells 11G and 11R, and thus the alignment of liquid crystal in the blue light liquid crystal cell 11B is easily affected by the lateral electric field. Accordingly, the average tilt angle at the time of applying the maximum gradation voltage, that is, the alignment state of liquid crystal can be substantially matched in all the liquid crystal cells 11R, 11G, and 11B. Accordingly, the ease of occurrence of disclination is the same in all the liquid crystal light valves 3R, 3G, and 3B, and thus it is possible to eliminate the feeling of discomfort caused by blue coloring, for example, even when disclination occurs when the black and white pattern is displayed.

In the embodiment, the pre-tilt angle θpB of the blue liquid crystal light valve 3B is set smaller than the pre-tilt angles θpG and θpR of the other liquid crystal light valves 3R and 3G, and the insulating film thickness tB of the blue liquid crystal light valve 3B is set smaller than the insulating film thicknesses of the other liquid crystal light valves 3R and 3G. Two means described above are combined such that the alignment states of liquid crystal are substantially the same in all the liquid crystal light valves 3R, 3G, and 3B. Instead of the configuration, the insulating film thickness tB of the blue liquid crystal light valve 3B may be set smaller than the insulating film thicknesses tR and tG of the other liquid crystal light valves 3R and 3G such that the alignment states of liquid crystal may be substantially the same in all the liquid crystal light valves 3R, 3G, and 3B. However, when the insulating film thickness is too small, a problem of flickering or burn-in occurs, and thus it is preferable to combine the other means by changing the insulating film thickness as described in the embodiment.

The technical scope of the invention is not limited to the embodiments, but may be variously modified within the scope which does not deviating from the concept of the invention. For example, in the embodiment, any of the cell thickness of the liquid crystal light valve, the refractive index anisotropy, the pre-tilt angle, and the insulating film thickness is changed such that the alignment states of liquid crystal are substantially the same in all the liquid crystal light valves. However, two parameters of four parameters may be arbitrarily changed. When the plurality of parameters are changed, the amount of change of individual parameters is small. In the embodiment, the example of applying the invention to the reflex-type liquid crystal light valve has been described, but the invention may be applied to a transmission-type liquid crystal light valve. In addition, materials, shapes, number, and disposition of various constituent members of the projector are not limited to the embodiment, and may be variously modified.

The entire disclosure of Japanese Patent Application No. 2011-005572, filed Jan. 14, 2011 is expressly incorporate by reference herein.

What is claimed is:

1. A projector comprising:
a lighting device that emits light that includes a first color and a second color;
a first liquid crystal light valve that modulates the first color;
a second liquid crystal light valve that modulates the second color; and
a color synthesizing optical system that superimposes the first color and the second color modulated by the first liquid crystal light valve and the second liquid crystal light valve, respectively,
wherein a cell thickness of the first liquid crystal light valve is smaller than a cell thickness of the second liquid crystal light valve, and an alignment state of liquid crystal at the time of applying a maximum gradation voltage is substantially the same in the first liquid crystal light valve and the second liquid crystal light valve.

2. A projector comprising:
a lighting device that emits light that includes a first color and a second color;
a first liquid crystal light valve that modulates the first color;
a second liquid crystal light valve that modulates the second color; and
a color synthesizing optical system that superimposes the first color and the second color modulated by the first liquid crystal light valve and the second liquid crystal light valve, respectively,
wherein refractive index anisotropy of liquid crystal of the first liquid crystal light valve is smaller than refractive index anisotropy of liquid crystal of the second liquid crystal light valve, and an alignment state of liquid crystal at the time of applying a maximum gradation voltage is substantially the same in the first liquid crystal light valve and the second liquid crystal light valve, and
a liquid crystal material of the first liquid crystal light valve is different than a liquid crystal material of the second liquid crystal light valve.

3. A projector comprising:
a lighting device that emits that includes a first color and a second color;
a first liquid crystal light valve that modulates the first color;
a second liquid crystal light valve that modulates the second color; and
a color synthesizing optical system that superimposes the first color and the second color modulated by the first liquid crystal light valve and the second liquid crystal light valve, respectively,
wherein a pre-tilt angle of liquid crystal molecules of the first liquid crystal light valve is smaller than a pre-tilt angle of liquid crystal molecules of the second liquid crystal light valve, and an alignment state of liquid crystal at the time of applying a maximum gradation voltage is substantially the same in the first liquid crystal light valve and the second liquid crystal light valve.

4. The projector according to claim 1,
wherein the first liquid crystal light valve has a first insulating film that is formed between a liquid crystal layer of the first liquid crystal light valve and a pixel electrode of the first liquid crystal light valve,
the second liquid crystal light valve has a second insulating film that is formed between a liquid crystal layer of the second liquid crystal light valve and a pixel electrode of the second liquid crystal light valve, and
a film thickness of the first insulating film is smaller than a film thickness of the second insulating film.

5. A projector comprising:
a lighting device that emits light that includes a first color and a second color;
a first liquid crystal light valve that modulates the first color;
a second liquid crystal light valve that modulates the second color; and
a color synthesizing optical system that superimposes the first color and the second color modulated by the first liquid crystal light valve and the second liquid crystal light valve, respectively,
wherein the first liquid crystal light valve has a first insulating film that is formed between a liquid crystal layer of the first liquid crystal light valve and a pixel electrode of the first liquid crystal light valve,
the second liquid crystal light valve has a second insulating film that is formed between a liquid crystal layer of the second liquid crystal light valve and a pixel electrode of the second liquid crystal light valve,
a film thickness of the first insulating film is smaller than a film thickness of the second insulating film, and
an alignment state of liquid crystal at the time of applying a maximum gradation voltage is substantially the same in the first liquid crystal light valve and the second liquid crystal light valve.

6. The projector according to claim 1, wherein the first color is a blue color and the second color is a green color.

7. The projector according to claim 1, wherein the liquid crystal light valve is a reflex-type liquid crystal light valve.

8. The projector according to claim 2, wherein the first color is a blue color and the second color is a green color.

9. The projector according to claim 1,
wherein the first liquid crystal light valve has a first insulating film that is formed between a liquid crystal layer of the first liquid crystal light valve and a common electrode of the first liquid crystal light valve,
the second liquid crystal light valve has a second insulating film that is formed between a liquid crystal layer of the second liquid crystal light valve and a common electrode of the second liquid crystal light valve, and
a film thickness of the first insulating film is smaller than a film thickness of the second insulating film.

* * * * *